_United States Patent Office_

3,253,015
Patented May 24, 1966

3,253,015
N,N-DISUBSTITUTED NITROXIDES AND PROCESS FOR PREPARING SAME
Arthur Kentaro Hoffmann, Stamford, Conn., assignor to American Cyanamid Company, Stamford, Conn., a corporation of Maine
No Drawing. Filed July 20, 1964, Ser. No. 383,942
6 Claims. (Cl. 260—465.5)

This application is a continuation-in-part of application Serial No. 202,051, filed June 13, 1962 and now abandoned.

This invention relates to new chemical compounds and to a process for preparing the same. More particularly, this invention relates to N,N-disubstituted nitroxides and to a process for preparing these compounds.

In copending application Serial No. 129,560, filed August 7, 1961, which issued December 29, 1964 as U.S. Patent 3,163,677, a class of N,N-disubstituted nitroxides of the general formula

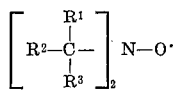

wherein $R^1$, $R^2$ and $R^3$ are each an alkyl radical are therein described and claimed. These unique compounds are stable free radicals and as such are useful as polymerization inhibitors and as antioxidants. In addition, such N,N-disubstituted nitroxides are useful as traps for reactive free radicals and as paramagnetic standards for electron spin resonance spectrometry.

It has now been discovered that N,N-disubstituted nitroxides having other than alkyl radicals as the $R^1$, $R^2$ and $R^3$ substituents appearing in the above formula may be readily prepared by a procedure which will be more fully described hereinafter.

These novel N,N-disubstituted nitroxides, which have the same properties as the N,N-disubstituted nitroxides described in copending application Serial No. 129,560, may be represented by the following structural formula:

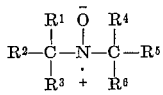

wherein $R^1$, $R^2$ and $R^3$ are the same or different alkyl groups having from one to fifteen carbon atoms; $R^4$ and $R^5$ are each selected from the group consisting of alkyl, phenyl and halogen-substituted phenyl and may be the same or different; and $R^6$ is selected from the group consisting of

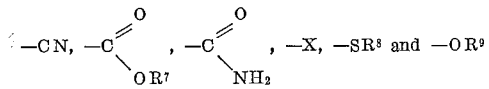

wherein $R^7$ is selected from the group consisting of alkyl and phenyl; X is a halogen atom selected from the group consisting of bromine, chlorine and fluorine; $R^8$ is selected from the group consisting of

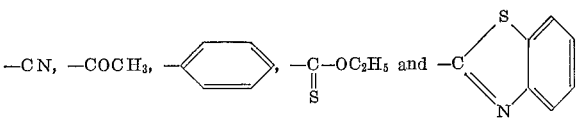

and $R^9$ is selected from the group consisting of —COCH$_3$ and —COC$_2$H$_5$.

From the formula appearing for the N,N-disubstituted nitroxides of application Serial No. 129,560 and the formula of this application, it will be readily observed that in both classes of nitroxides two tertiary carbon atoms are attached to a quadrivalent nitrogen atom. However, as indicated in the structural formula immediately above, that which distinguishes the respective classes of N,N-disubstituted nitroxides in the present invention is the substitution on one of the tertiary carbon atoms of one or more groups other than alkyl.

In preparing the class of N,N-disubstituted nitroxides of application Serial No. 129,560, a novel method, i.e., treating a nitro- or nitrosoalkane with an alkali metal in an inert reaction medium and in the absence of an oxidizing atmosphere, was therein disclosed and claimed. While the particular method there described was especially advantageous for the preparation of that class of N,N-disubstituted nitroxides, such method nevertheless possesses severe limitations. The principal disadvantage in such procedure is that N,N-disubstituted nitroxides containing functional groups which are sensitive to alkali metals may not be so prepared. An additional disadvantage is the necessity of conducting the reaction in an inert solvent in the absence of an oxidizing atmosphere. By contrast, the process of the present invention is applicable to the preparation of a wide class of N,N-disubstituted nitroxides having functional groups therein which are subject to attack by alkali metals.

In accordance with the present invention, the present process comprises heating a tertiary nitroso compound of the formula:

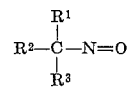

wherein $R^1$, $R^2$ and $R^3$ are the same or different alkyl groups having from one to fifteen carbon atoms with an azo compound of the formula:

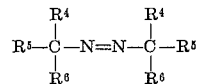

wherein $R^4$ and $R^5$ are each selected from the group consisting of alkyl, phenyl and halogen-substituted phenyl and may be the same or different; and $R^6$ is selected from the group consisting of

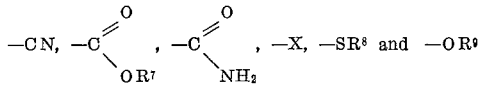

wherein $R^7$ is selected from the group consisting of alkyl and phenyl; X is a halogen atom selected from the group consisting of bromine, chlorine and fluorine; $R^8$ is selected from the group consisting of

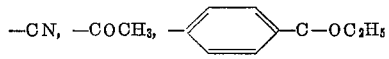

and

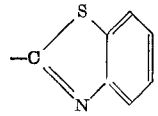

and $R^9$ is selected from the group consisting of —COCH$_3$ and —COC$_2$H$_5$ at a temperature of from about 50° C. to about 200° C. thereby causing decomposition of the azo compound into free radicals and subsequently recovering the resultant N,N-disubstituted nitroxide.

After completion of the reaction, the N,N-disubstituted nitroxide may be effectively isolated by first reducing it in a solution with hydrazine to form the corresponding hydroxylamine. The hydroxylamine is then isolated by precipitation of the same as its salt with a mineral acid such as hydrogen chloride, hydrogen bromide, hydrogen iodide, sulfuric acid, nitric acid, perchloric acid, trifluoroacetic acid, tetrafluoroboric acid and the like. The solid is then filtered and recrystallized from an inert solvent such as benzene, ethanol, acetonitrile or the like. Subsequently, the purified salt is neutralized with an aqueous base such as a hydroxide or a carbonate of an alkali metal, alkaline earth metal or ammonium, e.g. sodium hydroxide, potassium carbonate and the like. The liberated N,N-disubstituted hydroxylamine which is obtained is then allowed to oxidize in air to reform the N,N-disubstituted nitroxide in substantially pure condition. In addition, however, the oxidation to the nitroxide may be accomplished by means of using other oxidizing agents such as oxygen, silver oxide, mercuric oxide, chloranil and the like.

Suitable tertiary nitroso compounds which may be employed in the process of the invention to form the novel N,N-disubstituted nitroxides include nitroso-tert-butane, 2-nitroso-2,5-dimethylhexane, 2-cyano-2-nitrosopropane and the like. Similarly, other tertiary nitroso compounds, prepared by a method such as that outlined by Emmons, J. Am. Chem. Soc. 79, 6522 (1957), may be employed.

Of general applicability in the process of this invention are azo compounds which have an acyclic azo (—N=N—) group bonded to different, i.e. distinct or separate, carbons which are non-aromatic, i.e. aliphatic or cycloaliphatic, both of which are tertiary, i.e. do not contain hydrogen atoms on these carbon atoms which are bonded to the azo nitrogen atoms. The more active and therefore the preferred azo compounds within this class are those in which one or both tertiary carbon atoms have attached to them through carbon a radical containing an oxygen, sulfur or nitrogen atom. Symmetrical azo compounds having as the negative group attached to the tertiary carbon atoms a nitrile, carboxamide or ester group which react readily at lower temperatures are preferred.

Azo compounds which are symmetrical and accordingly have two tertiary aliphatic or alicyclic carbons, i.e. a tertiary carbon aliphatic or alicyclic in character attached to each of the azo nitrogens, are exemplified by the following non-limiting listing: $\alpha,\alpha'$-azodiisobutyronitrile, $\alpha,\alpha'$-azobis($\alpha,\gamma$-dimethylvaleronitrile), $\alpha,\alpha'$-azobis($\alpha$-methyl-butyronitrile), $\alpha,\alpha'$-azobis($\alpha$-ethylbutyronitrile), $\alpha,\alpha'$-azobis($\alpha$-methylenanthonitrile), $\alpha,\alpha'$-azobis($\alpha$-phenylpropionitrile), $\alpha,\alpha'$-azobis($\alpha$-cyclopropylpropionitrile), $\alpha,\alpha'$-azobis($\alpha$-cyclohexylpropionitrile), $\alpha,\alpha'$-azobis($\alpha$-isopropyl-$\beta$-methylbutyronitrile), $\alpha,\alpha'$-azobis($\alpha,\gamma$-dimethylcapronitrile), $\alpha,\alpha'$-azobis($\alpha$-n-butylcapronitrile), $\alpha,\alpha'$-azobis($\alpha$-isobutyl-$\gamma$-methylvaleronitrile), $\alpha,\alpha'$-azobis($\alpha$-methyl-$\gamma$-carboxybutyronitrile) and its salts, e.g., the disodium salt, 1,1'-azodicyclohexanecarbonitrile, 1,1'-azodicycloheptanecarbonitrile, 1,1'-azobis(3-methylcyclopentanecarbonitrile), 1,1'-azobis(2,4-dimethylcyclohexanecarbonitrile), 1,1'-azodicamphanecarbonitrile (the azonitrile derived from camphor) and the corresponding amides and esters of the above in which the nitrile group or groups are replaced by amide and/or ester groups, e.g., to give $\alpha,\alpha'$-azodiisobutyramide, $\alpha,\alpha'$-azobis($\alpha,\gamma$-dimethylvaleramide), $\alpha,\alpha'$-azobis($\alpha$-cyclopropylpropionamide), 1,1'-azodicyclohexanecarboxamide,, $\alpha,\alpha'$-azobis(N-ethylisobutyramide), dimethyl 1,1'-azodicyclohexanecarboxylate, and dimethyl, diethyl and dihexyl $\alpha,\alpha'$-azodiisobutyrate. Preferably lower alkyl esters, e.g., of the 1–6 carbon alcohols are used. The azonitrile can be converted to amides and esters by known procedures, e.g., by formation of the iminoether hydrochloride by reaction with dry hydrogen chloride and an anhydrous alcohol followed by reaction with ammonia or the appropriate hydrogen-bearing amine, or with water.

Because of the ease of preparation from available ketones, the nitriles of $\alpha,\alpha'$-azodialkanoic acids and the lower (1 to 6 carbon) alkyl esters and the amides of such acids are particularly preferred.

In general, the more useful compounds have aliphatic or cycloaliphatic radicals of 4–11 carbons on each of the azo nitrogens and usually have carbon and hydrogen or carbon, hydrogen and oxygen as the elements in the radical excepting the negative substituent on the tertiary carbon.

Other suitable azo compounds which may be employed in the preparation of the novel nitroxides of this invention are included in the following non-limiting listing: 1,1'-azobis(1-chloro-1-phenylethane), 1,1'-azobis[1-(p-bromophenyl)-1-chloroethane], 2,2'-azodi-2-propanol diacetate, 2,2'-azobis(2-thiocyanatopropane), 2,2'-azobis[2-(phenylthio)propane], and 2,2'-azobis[2-(2-benzothiazolylthio)propane]. Such immediately mentioned azo compounds and others which are also capable of utilization are described in: S. Goldschmidt and B. Acksteiner, Ann., 618, 173–185 (1958); E. Benzing, Ann., 631, 1–9 (1960); E. Benzing, Ann., 631, 10–21 (1960); E. Benzing, Angew. Chem., 72, 709 (1960); and U.S. Patent 2,471,959 to Hunt.

Generally, the particularly preferred compounds are azo compounds not containing free carboxyl groups.

The temperature employed in the present process wherein a tertiary nitroso compound is reacted with an azo compound may be varied over a wide range. In general, however, temperatures of from about 50° C. to about 200° C. are employed with good success while temperatures of from about 50° C. to about 150° C. are preferred.

The process herein will be generally conducted by employing approximately one mole of azo compound for each two moles of tertiary nitroso compound. In some instances, however, this mole ratio may be altered to from about 1:1 to 1:3. Preferably, the tertiary nitroso compound is employed in a quantity equal to or in excess of the azo compound.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

*Example 1.—1-carbomethoxy-1-methylethyl tert-butyl nitroxide*

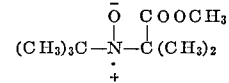

Eleven and five-tenths grams (0.05 mole) of dimethyl $\alpha,\alpha'$-azodiisobutyrate and 8.7 g. (0.10 mole) of nitroso-tert-butane are charged into a glass liner and heated in an autoclave at 85° C. for six hours. At the end of this time the autoclave is vented and the clear orange liquid reaction mass is poured out. Examination of the crude reaction mixture by electron spin resonance spectroscopy shows that a stable free radical is present and by virtue of the observed hyperfine structure of the spectrum, the odd electron is associated with a nitrogen atom. The reaction product moreover reacted instantly with tetracyano-ethylene to form a dark red solution. This test is additional evidence of the presence of a nitroxide linkage in the reaction product.

*Example 2.—1-cyano-1-methylethyl tert-butyl nitroxide*

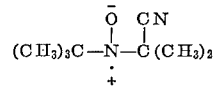

The procedure of Example 1 is repeated in all essential respects except that 8.7 g. (0.10 mole) of nitroso-tert-butane and 8.2 g. (0.05 mole) of $\alpha,\alpha'$-azodiisobutyronitrile are heated at 85° C. for four hours. Examination of the reaction mixture indicates results similar to those obtained in Example 1.

*Example 3.—1-cyano-1-methylpropyl tert-butyl nitroxide*

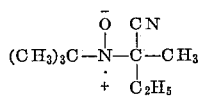

To 35 g. (0.4 mole) of nitroso-tert-butane dissolved in 100 ml. of benzene are added 19.2 g. (0.1 mole) of α,α'-azobis(α-methylbutyronitrile). The solution is heated at 85° C. for one hour in an autoclave equipped with a glass liner. At the end of this time the autoclave is vented and the solvent is evaporated in vacuum from the dark solution. The residue is shown by electron spin resonance spectroscopy (e.s.r.) to have a high concentration of free radicals whose spectrum consists of a triplet of equal intensity associated with a free electron on a nitrogen 14 nucleus as is required for 1-cyano-1-methylpropyl tert-butyl nitroxide.

*Example 4.—1-carbethoxy-1-methylethyl tert-butyl nitroxide*

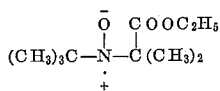

The procedure of Example 3 is repeated in all essential respects except that 25.8 g. (0.1 mole) of diethyl α,α'-azodiisobutyrate are added to the reaction vessel in place of α,α'-azobis(α-methylbutyronitrile). Similar results are obtained.

*Example 5.—α-Chloro-α-methylbenzyl tert-butyl nitroxide*

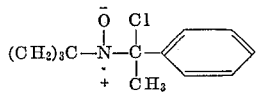

Thirty and eight-tenths grams (0.1 mole) of 1,1'-azobis(1-chloro-1-phenylethane) in 100 ml. of xylene are heated with 35 g. (0.4 mole) of nitroso-tert-butane at 135° C. for one-half hour in an autoclave equipped with a glass liner. At the end of this time, the reaction mass is cooled and the solvent is removed by vacuum evaporation. The product shows a high percentage of stable free radicals.

*Example 6.—p-Bromo-α-chloro-α-methylbenzyl tert-butyl nitroxide*

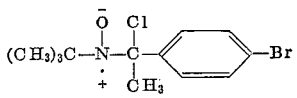

The procedure of Example 5 is repeated except that 46.6 g. (0.1 mole) of 1,1'-azobis[1-(p-bromophenyl)-1-chloroethane] is added to the reaction mixture in place of 1,1'-azobis(1-chloro-1-phenylethane).

*Example 7.—1-acetoxy-1-methylethyl tert-butyl nitroxide*

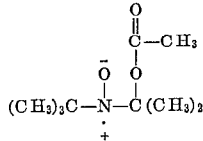

Twenty-three grams (0.1 mole) of 2,2'-azodi-2-propanol diacetate are heated with 200 ml. of benzene containing 35 g. (0.1 mole) of nitroso-tert-butane in a glass-lined autoclave at 150° C. for one-half hour. Substantial quantities of stable free radicals are produced by this method.

An alternative procedure employing the same reactants is carried out as follows. The reactants are dissolved in a high boiling inert hydrocarbon solvent, n-hexadecane, and the reaction solution passed through a tube containing a zone heated to about 200° C. The contact time of the solution within the heated zone is about one minute. Again, substantial quantities of stable free radicals are obtained.

*Example 8.—1-thiocyanato-1-methylethyl tert-butyl nitroxide*

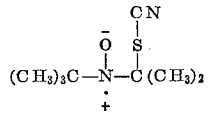

The procedure of Example 3 is repeated except that 22.8 g. (0.1 mole) of 2,2'-azobis(2-thiocyanatopropane) are heated in benzene for one-half hour at 120° C. in the presence of 35 g. (0.4 mole) of nitroso-tert-butane.

*Example 9.—1-(phenylthio)-1-methylethyl tert-butyl nitroxide*

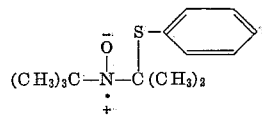

The procedure of Example 8 is repeated except that 37.0 g. (0.1 mole) of 2,2'-azobis[2-(phenylthio)propane] are heated at 125° C. in the presence of 35 g. (0.4 mole) of nitroso-tert-butane.

*Example 10.—1-(2-benzothiazolylthio)-1-methylethyl tert-butyl nitroxide*

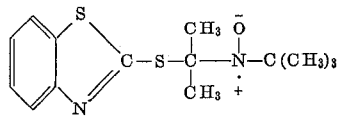

The procedure of Example 9 is repeated except that 38.0 g. (0.1 mole) of 2,2'-azobis[2-(2-benzothiazolylthio) propane] is added to the reaction mixture in place of 2,2'-azobis[2-(phenylthio)propane].

*Example 11.—1,1,4-trimethylpentyl-1-cyano-1-methylethyl nitroxide*

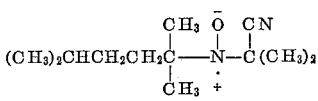

The procedure of Example 3 is repeated except that 57.0 g. (0.4 mole) of 2-nitroso-2,5-dimethylhexane is used in place of nitroso-tert-butane.

In all of the foregoing examples, after completion of the reaction, the product nitroxide is effectively recovered by first reducing it in solution with hydrazine to form the corresponding hydroxylamine. The hydroxylamine is then isolated by precipitating it as the hydrochloride with anhydrous hydrogen chloride, filtering the solid and recrystallizing it from benzene or acetonitrile. After neutralizing the purified hydrochloride with aqueous base, the liberated hydroxylamine is allowed to oxidize in air to reform the nitroxide in substantially pure condition.

*Examples 12–21*

Other compounds, preparable by procedures substantially the same as those of the above examples, are forth in Table I.

Table I

EXAMPLE 12

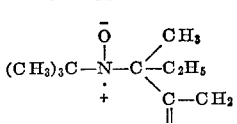

1-carbamoyl-1-methylpropyl tert-butyl nitroxide

EXAMPLE 13

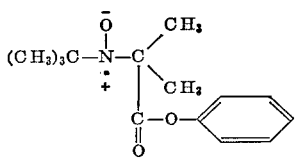

1-methyl-1-(phenoxy-carbonyl) ethyl tert-butyl nitroxide

EXAMPLE 14

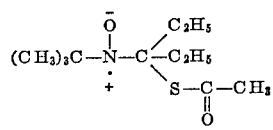

1-(acetylthio)-1-ethylpropyl tert-butyl nitroxide

EXAMPLE 15

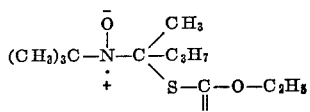

1-[(ethoxythiocarbonyl)-thio]-1-methylbutyl tert-butyl nitroxide

EXAMPLE 16

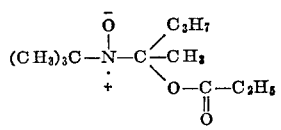

1-methyl-1-(propionyl-oxy)butyl tert-butyl nitroxide

EXAMPLE 17

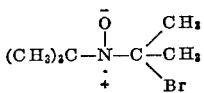

1-bromo-1-methylethyl tert-butyl nitroxide

EXAMPLE 18

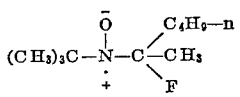

1-fluoro-1-methylpentyl tert-butyl nitroxide

EXAMPLE 19

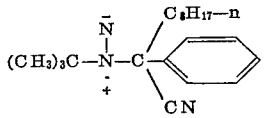

1-cyano-1-phenylnonyl tert-butyl nitroxide

EXAMPLE 20

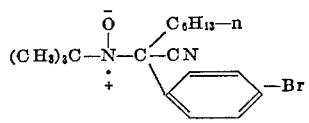

1-(p-bromo-phenyl)-1-cyanoheptyl tert-butyl nitroxide

EXAMPLE 21

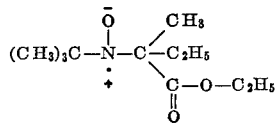

1-methyl-1-(ethoxy-carbonyl)propyl tert-butyl nitroxide

I claim:

1. An N,N-disubstituted nitroxide of the formula:

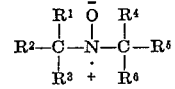

wherein $R^1$, $R^2$ and $R^3$ are alkyl having from one to fifteen carbon atoms; $R^4$ and $R^5$ selected from the group consisting of alkyl, having from one to fifteen carbon atoms, phenyl and halogen-substituted phenyl; and $R^6$ is selected from the group consisting of

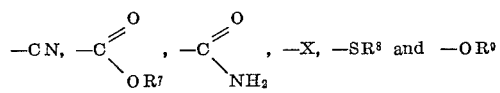

wherein $R^7$ is selected from the group consisting of alkyl having from one to fifteen carbon atoms and phenyl; X is a halogen atom selected from the group consisting of bromine, chlorine and fluorine; $R^8$ is selected from the group consisting of

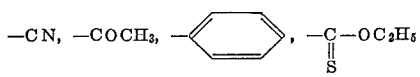

and

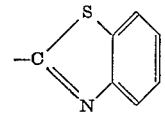

and $R^9$ is selected from the group consisting of —COCH$_3$ and —COC$_2$H$_5$.

2. 1-cyano-1-methylethyl tert-butyl nitroxide.
3. 1-cyano-1-methylpropyl tert-butyl nitroxide.
4. 1-carbomethoxy-1-methylethyl tert-butyl nitroxide.
5. 1,1,4 - trimethylpentyl 1 - cyano - 1 - methylethyl nitroxide.
6. A process for preparing an N,N-disubstituted nitroxide of the formula:

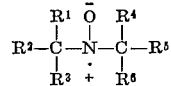

wherein $R^1$, $R^2$ and $R^3$ are alkyl having from one to fifteen carbon atoms; $R^4$ and $R^5$ are selected from the group consisting of alkyl, having from one to fifteen carbon atoms phenyl and halogen-substituted phenyl; and $R^6$ is selected from the group consisting of

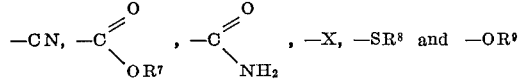

wherein $R^7$ is selected from the group consisting of alkyl having from one to fifteen carbon atoms and phenyl; X is a halogen atom selected from the group consisting of bromine, chlorine and fluorine; $R^8$ is selected from the group consisting of

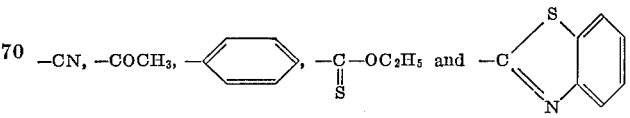

and $R^9$ is selected from the group consisting of —COCH$_3$ and —COC$_2$H$_5$ which comprises heating at a temperature from about 50° C. to 200° C. a tertiary nitroso compound of the formula:
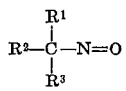
with an azo compound of the formula:
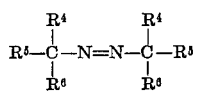
in which $R^1$, $R^2$, $R^3$, $R^4$, $R^5$ and $R^6$ have the meaning defined above and recovering the resultant N,N-disubstituted nitroxide.
References Cited by the Examiner
UNITED STATES PATENTS
3,163,677  12/1964  Hoffman et al. _____ 260—583
CHARLES B. PARKER, *Primary Examiner.*